Dec. 12, 1950
T. R. BURNIGHT ET AL
2,533,219
KEYING CIRCUIT
Filed Nov. 13, 1945
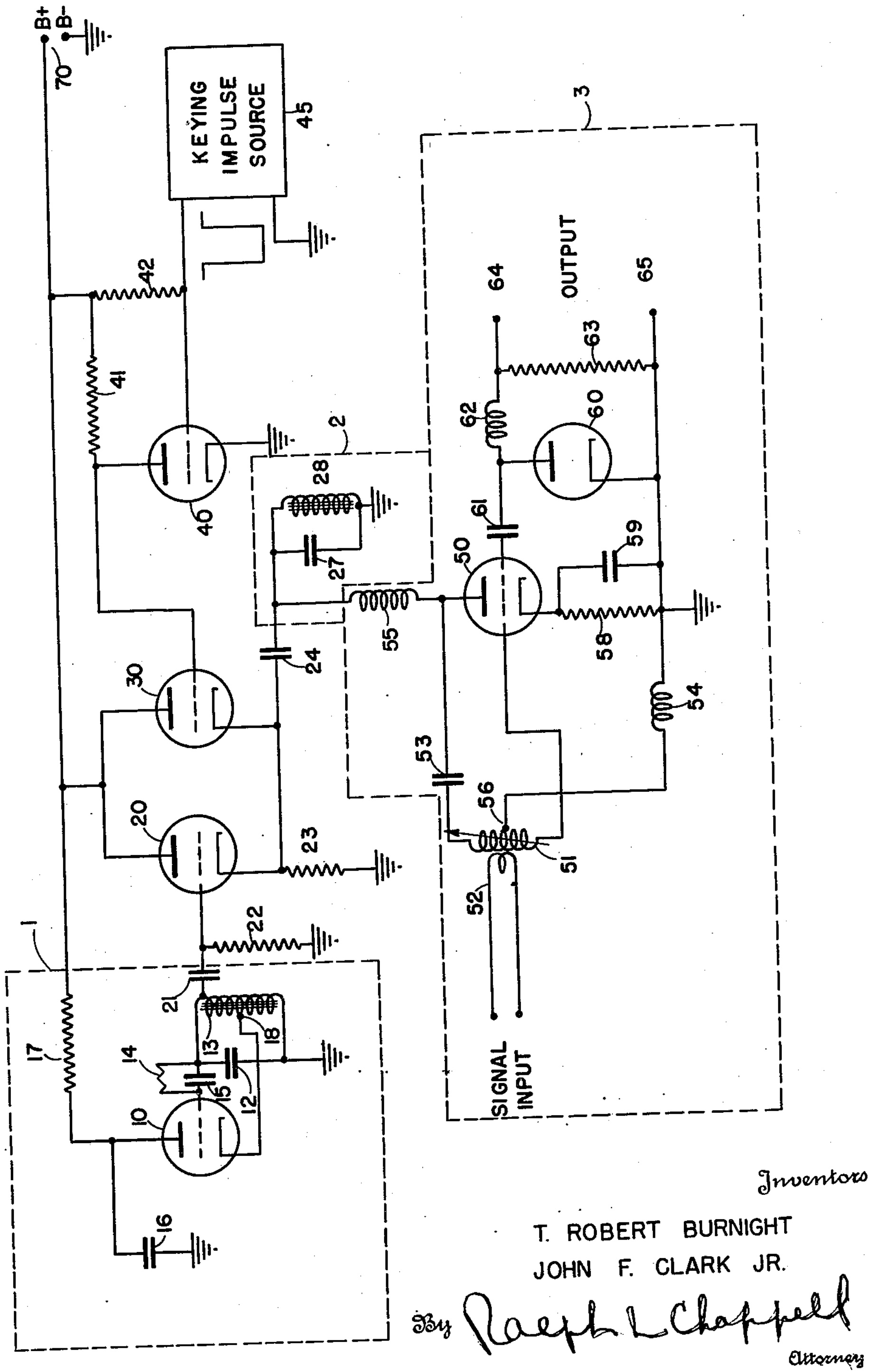
Inventors
T. ROBERT BURNIGHT
JOHN F. CLARK JR.
By Ralph L. Chappell
Attorney Patented Dec. 12, 1950

2,533,219

UNITED STATES PATENT OFFICE 2,533,219

KEYING CIRCUIT

Thomas Robert Burnight and John F. Clark, Jr., Washington, D. C.

Application November 13, 1945, Serial No. 628,338

5 Claims. (Cl. 250—27)

(Granted under the act of March 3, 1883, as amended April 30, 1928; 370 O. G. 757)

This invention relates to keying circuits and is particularly directed to providing an electronic switch for keying successfully a transmission circuit carrying high frequency currents.

Rapid, clean-cut keying of circuits carrying radio frequency currents is difficult to accomplish because of several complicating factors not encountered in low frequency circuits. Capacitances in the keying apparatus may allow R. F. currents to leak through to the load even when the key is nominally open. Intermittent making and breaking of the R. F. circuit may result in generator instability, since R. F. generators are usually not linear devices and may shift frequency and wave form as a result of changing load conditions. The keying apparatus itself may load the generator with resistance or capacitance. Finally, if the load circuit contains a tank circuit or any other components capable of oscillation under transient shock, a sudden opening of the transmission circuit may not result in immediate reduction of the load current to zero but may instead bring about transient oscillations continuing for an appreciable period of time.

An object of this invention is to provide a means by which a transmission circuit carrying high frequency currents may be keyed at high or low speeds without appreciable variation in the degree of loading of the current source.

Another object of this invention is to provide an electronic switch for high frequency transmission circuits which does not load the current source or pass appreciable leakage currents.

Another object of this invention is to provide an electronic switch which rapidly dissipates residual energy in a load circuit after disconnecting the load circuit from its power source.

The invention will be described with reference to the appended drawing, which is a diagram in schematic and block form showing the invention employed in a receiver application. The transmission circuit of the present invention receives a high frequency alternating input signal from oscillator 1 and delivers the signal to tank load 2 for application to receiver 3. The operation of auxiliary components 1, 2 and 3 will be described in detail in later paragraphs.

Voltage from oscillator 1 is applied to the grid of tube 20, which is returned to ground through resistor 22. The cathode of tube 20 is connected to ground through load resistor 23 and is coupled to tank load 2 by condenser 24. The plate of tube 20 is connected to the positive side of D. C. source 70; the negative side of D. C. source 70 is grounded.

The plate of tube 30 is connected to the plate of tube 20, and the cathode of tube 30 is connected to the cathode of tube 20. The grid of tube 30 is tied directly to the plate of tube 40, which is connected to the positive side of source 70 through high resistance 41. The cathode of tube 40 is grounded; its grid is connected to the positive side of source 70 through resistance 42. Keying impulse source 45 is shown in block form; it is a device which supplies a negative voltage during those times when the transmission circuit from oscillator 1 to load circuit 2 is to be interrupted. Source 45 is connected between the grid of tube 40 and ground.

In describing how the invention functions intermittently to interrupt the transmission of energy to load circuit 2, it will first be assumed that no keying impulse is being produced by source 45. In the absence of a keying impulse, tube 20 functions as a power amplifier of the cathode follower type, receiving on its grid signal voltage from the oscillator 1, which is a relatively high impedance source incapable of delivering much power to a load. Signal-frequency voltage appears at the cathode of tube 20 greatly increased in power level, and is fed through coupling condenser 24 to tank load 2. The power ouput of tube 20 is sufficient to maintain large amplitude oscillations in tank load 2 notwithstanding the energy consumed therefrom by receiver 3. The peak to peak magnitude of the signal frequency component of voltage at the cathode of tube 20 may be of the order of 200 volts; and the average potential at the cathode may be about ninety volts.

Under the conditions now being described, that is, when no keying impulse is coming from source 45, tube 30 in parallel with tube 20 does not affect the operation in any way. Its grid voltage is the same as the plate voltage of tube 40, which is only ten to fifteen volts above ground, since tube 40 conducts in the absence of a keying impulse and a large drop occurs in resistor 41. The grid of tube 30, therefore, is fifteen volts or more negative with respect to its cathode at all parts of the signal voltage cycle and tube 30 passes no plate current.

Now assume that a negative keying impulse is initiated by impulse source 45. The grid of tube 40 is at once driven below cutoff, plate current ceases to flow in resistor 41, and the voltage at the grid of tube 30 starts to rise charging the distributed capacity associated therewith. Presently, tube 30 begins to draw plate current, and the added drop in cathode resistor 23 causes the cathodes of tubes 20 and 30 to rise in potential also. A state of equilibrium is attained when the grid of tube 30 starts to draw current; this occurs when the cathodes of tubes 20 and 30 are considerably more positive than the maximum voltage attained by the grid of tube 20. With its cathode at such a high positive potential, tube 20 is at this point wholly blocked. Hence, no energy can pass through tube 20 to tank load 2. Moreover, load circuit 2 is now shunted by the output impedance of tube 30, which is of the order of 300 ohms; consequently the stored energy in the tank circuit is very rapidly dissipated, and transient oscillations which would otherwise occur in tank circuit 2 are suppressed.

Oscillator 1 is not affected by the switching action, since the load on it is not appreciably different whether the transmission circuit is open or closed.

When the keying impulse from source 45 ends, tube 40 conducts again, plate current flows through resistor 41, the grid of tube 30 returns to its previous low voltage, tube 30 ceases to draw plate current, and tube 20 resumes normal operation. Energy from oscillator 1 is again stepped up in power level and fed to tank load 2 as before. The total recovery time is only a few microseconds.

The circuit components with which the invention is incorporated in the drawing are units of a super-regenerative receiver. This invention is here employed as an electronic switch to suppress the receiver at intervals such as may be necessary to prevent radiation from the receiver from interfering with intermittently-operating radio equipment located nearby.

Oscillator 1 is a source of quench voltage for super-regenerative receiver 3; it comprises triode tube 10 functioning as a Hartley oscillator. Condenser 12 and coil 13 are connected in parallel to form a tank circuit; one side of the tank circuit is connected to the grid of tube 10 through the grid leak biasing circuit consisting of condenser 15 and resistor 14 in parallel. The other side of the tank circuit 12, 13 is grounded. The cathode of tube 10 is connected to tap 18 on coil 13; the plate of tube 10 is by-passed to ground by condenser 16. Plate supply voltage for tube 10 is provided by source 70 through decoupling resistor 17. Output voltage from tube 10 is coupled to the grid of tube 20 by condenser 21. The frequency of oscillator 1 is of a magnitude suitable for quenching a high-frequency super-regenerative receiver; 600 kc./s. might be a typical value.

Tank load circuit 2 consists of condenser 27 and coil 28 in parallel. One side of tank 2 is grounded, the other is coupled through condenser 24 to the cathode of tube 20. Tank 2 is resonant at the frequency of oscillator 1, and it serves to reduce the harmonic content of the pulsating voltage provided by tube 20 as a plate supply for super regenerative receiver 3.

Receiver 3 comprises super-regenerative amplifier tube 50 and detector diode 60. Voltage from tank circuit 2 is applied to the plate of tube 50 through R. F. choke coil 55, which passes current of the quench frequency readily but offers high impedance to currents of the radio signal frequencies. Tube 50 is connected in a conventional high-frequency super-regenerative amplifier circuit, comprising self-resonant coil 51, blocking condenser 53, a grid biasing circuit consisting of condenser 59 and resistor 58 in parallel, and R. F. choke coil 54. Radio signals are introduced in coil 51 by inductive coupling from loop 52. The modulation envelope of the voltage in coil 51 is detected by diode 60 and the resulting video voltage appears across diode load resistor 63 and hence across output terminals 64 and 65.

It will be understood that the embodiment of this invention herein shown and described is exemplary only, and that the scope of the invention is to be determined from the appended claims.

The invention described herein may be manufactured and used by or for the Government of the United States of America for governmental purposes without the payment of any royalties thereon or therefor.

What is claimed is:

1. In combination, a first electron tube having a cathode, an anode, and a grid; power supply means connected between the anode and ground; impedance means connected between cathode and ground comprising an oscillatory network and a direct connected resistance; means for applying an alternating input signal to the grid; a second electron tube having a cathode, an anode, and a grid; means connecting the anode of the second tube to the power supply means; means connecting the cathode of the second tube to the cathode of the first tube; and signal input means connected to the grid of the second tube for applying a positive potential thereto operative to block the first tube to the input signal by raising its cathode potential and to damp the oscillatory network with the low cathode output impedance of the second tube.

2. In combination, a first electron tube having a cathode, an anode, and a grid; power supply means connected between the anode and ground; means for applying an alternating input signal to the grid; impedance means connected between the cathode and ground comprising a network resonant to input signal frequencies and a direct connected resistance; a second electron tube having a cathode, an anode and grid; means connecting the anode of the second tube to the power supply means; means connecting the cathode of the second tube to the cathode of the first tube; and signal input means connected to the grid of the second tube for applying a positive potential thereto operative to block the first tube to the input signal by raising its cathode potential and to damp the resonant network with the low cathode output impedance of the second tube.

3. In combination, a first electron tube having a cathode, an anode, and a grid; power supply means connected between the anode and ground; impedance means connected between the cathode and ground; alternating voltage generator means connected between the grid and ground; load means coupled to the cathode and normally deriving alternating current energy therefrom; a second electron tube having a cathode, an anode, and a grid; means connecting the anode of the second tube to the power supply means; means connecting the cathode of the second tube to the cathode of the first tube; means coupled to the gride of the second tube normally operative to maintain a bias voltage thereon; and signal input means connected to the grid of the second tube for applying thereto a positive potential operative to block the first tube by raising its cathode potential and to shunt the load means with the low cathode output impedance of the second tube.

4. In combination, a first electron tube having a cathode, an anode, and a grid; power supply means connected between the anode and ground; impedance means connected between the cathode and ground; alternating voltage generator means connected between the grid and ground; load means coupled to the cathode and normally deriving alternating current energy therefrom; a second electron tube having a cathode, an anode, and a grid; means connecting the anode of the second tube to the power supply means; means connecting the cathode of the second tube to the cathode of the first tube; a third electron tube having a cathode, an anode, and a grid; means grounding the cathode of the third tube; means connecting the grid of the second tube to the anode of the third tube; impedance means connecting the anode of the third tube to the power supply means; means operative so to bias the grid of the third tube as to render the third tube normally conducting; and signal input means connected to the grid of the third tube for applying a blocking bias thereto operative to block the first tube by raising its cathode potential and to shunt the load means with the low cathode output impedance of the second tube.

5. In combination, first and second cathode loaded electron tubes having their cathodes connected together, an inductance-capacitance resonant circuit providing a part of the load impedance for the electron tubes, means normally biasing the first tube as a heavily conductive current amplifier, bias supply means normally holding the second tube non-conductive, first signal input means applying signals to be amplified to the first tube, and second signal input means connected to the second tube periodically reducing the biasing voltages thereon driving the second tube to heavier conduction than the first tube whereby the first tube is cut off and the resonant circuit heavily damped.

T. ROBERT BURNIGHT.
JOHN F. CLARK, JR.

REFERENCES CITED

The following references are of record in the file of this patent:

UNITED STATES PATENTS

| Number | Name | Date |
|---|---|---|
| 2,171,536 | Bingley | Sept. 5, 1939 |
| 2,300,999 | Williams | Nov. 3, 1942 |